United States Patent
Seel et al.

(10) Patent No.: US 6,598,921 B2
(45) Date of Patent: Jul. 29, 2003

(54) PROTECTIVE DEVICE FOR SECURING THE STORAGE SPACE IN THE INTERIOR OF A VEHICLE

(75) Inventors: Holger Seel, Aidlingen (DE); Marina Ehrenberger, Esslingen (DE)

(73) Assignee: BOS GmbH & Co. KG, Ostfildern (DE)

(*) Notice: Subject to any disclaimer, the term of this patent is extended or adjusted under 35 U.S.C. 154(b) by 0 days.

(21) Appl. No.: 09/949,769

(22) Filed: Sep. 12, 2001

(65) Prior Publication Data
US 2002/0067047 A1 Jun. 6, 2002

(30) Foreign Application Priority Data
Sep. 12, 2000 (DE) .......................... 100 44 958

(51) Int. Cl.⁷ ............................... B60R 21/06
(52) U.S. Cl. .................. 296/24.1; 296/37.16; 280/749; 160/291; 160/302; 242/384.4
(58) Field of Search .............. 296/24.1, 37.16; 160/291, 300, 302, 313, 370.22; 242/384.4, 384, 382; 280/749

(56) References Cited

U.S. PATENT DOCUMENTS

| 4,202,577 | A | * | 5/1980 | Breitschwerdt et al. ...... 280/749 |
| 5,288,122 | A | * | 2/1994 | Pilhall ........................ 160/120 |
| 5,551,726 | A | * | 9/1996 | Ament ........................ 280/749 |
| 5,882,084 | A | * | 3/1999 | Verellen et al. ............. 280/749 |
| 6,155,621 | A | * | 12/2000 | Nishida et al. ............. 280/749 |
| 6,349,986 | B1 | * | 2/2002 | Seel et al. .................. 160/265 |

FOREIGN PATENT DOCUMENTS

JP 10024790 A * 1/1998 ........... B60R/21/06

* cited by examiner

*Primary Examiner*—D. Glenn Dayoan
*Assistant Examiner*—Patricia Engle
(74) *Attorney, Agent, or Firm*—Greenberg Traurig, P.C.

(57) ABSTRACT

A protecting device for securing a storage space in the interior of a vehicle has a winding shaft associated, both in the pullout and in the rollup direction, with a control device which determines the rotations of the winding shaft as well as a selected protective position of the flat shaped article, and which, independently of the determined position, limits the pullout path for the flat shaped article to a length corresponding to the selected protective position, or releases it to be completely pulled out.

7 Claims, 6 Drawing Sheets

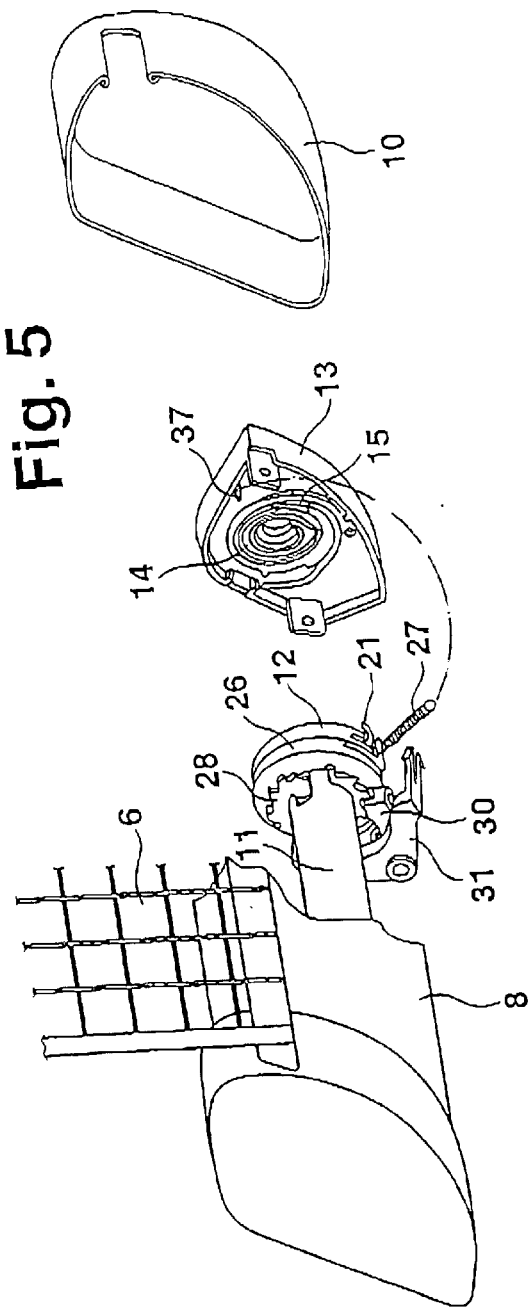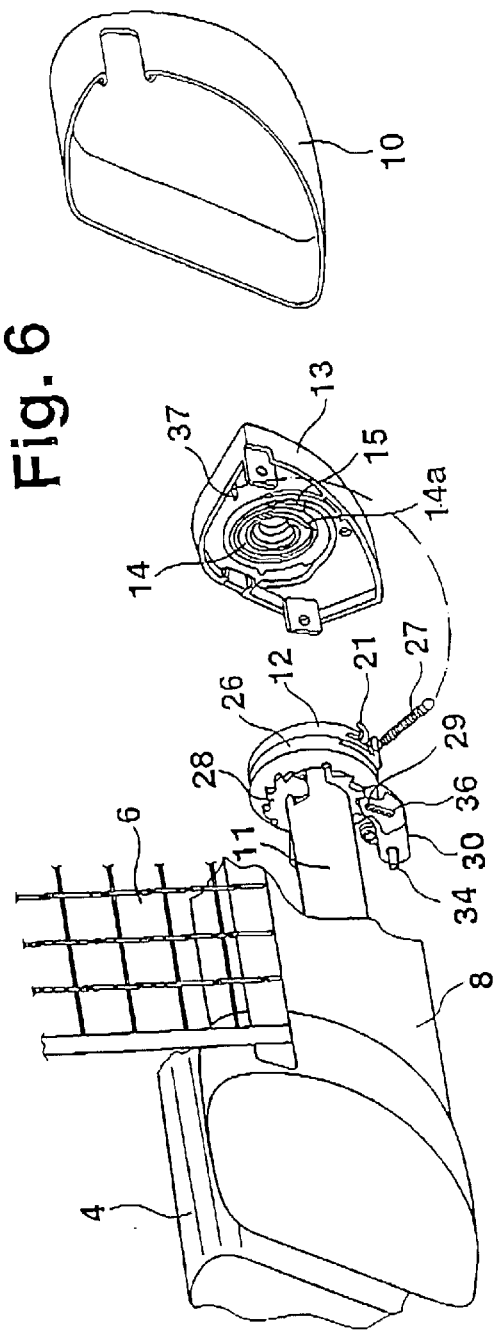

PROTECTIVE DEVICE FOR SECURING THE STORAGE SPACE IN THE INTERIOR OF A VEHICLE

BACKGROUND OF THE INVENTION

1. Technical Field of the Invention

The invention relates to a protective device for securing a storage space in the interior of a vehicle with a winding shaft which is pivoted in a winding housing's, on which a flexible flat shaped article is held in a manner so it can be pulled out and rolled in, which article can be anchored rigidly to the vehicle in at least one short and at least one long protective position, which allows the structure to be pulled out.

2. The Prior Art

Such a protective device for station wagons in general is known. The protective device presents a box housing which serves as winding housing, and which is attached to the back of the backrest of a back seat in a manner which allows it to be detached. A winding shaft is pivoted in the box housing, and a flexible flat shaped article, preferably in the form of a separation net, is held on it in a manner which allows it to be pulled out and rolled in. The separation net extends to the outside through a longitudinal slit in the box housing, and it is provided at its front end with a pullout bar, which can be anchored in a vertically pulled out protective position in holding devices which are rigidly attached to the vehicle in the roof area of the interior of the vehicle. The backrest can be positioned both in an upright functional position as well as in a lying position, tipped forward. In the tipped lying position, the storage space, compared to the upright functional position of the backrest, is accordingly enlarged. To be able to achieve, in both cases, the separation of the storage space from the rest of the interior of the vehicle, the separation net has a length chosen such that the separation net can be pulled out upward, even in the tipped lying position of the backrest out of the box housing and attached in corresponding holding devices which are rigidly attached to the vehicle in the roof area of the interior of the vehicle. For the upright position of the backrest and the tipped lying position of the backrest, different pullout lengths are therefore required so that the flat shaped article which is in the form of the separation net assumes, in each case, vertical protective positions.

From DE 196 43 691 C2, an additional protective device for securing a storage space in the interior of a vehicle is known, in which a separation net held on a winding shaft is positioned in a box housing, where the box housing is attached to the back of the backrest of a back seat. The winding shaft is, in addition, associated with an acceleration actuated lock device, which effects, in the case of a vehicle impact during which objects are projected into the safety net, the unwinding of the safety net and achieves a reliable retention by means of the separation net.

The problem of the invention is to provide a protective device of the type mentioned in the introduction, which allows, in every protective position of the flat shaped article, an acceleration-independent tight securing of the flat shaped article.

SUMMARY OF THE INVENTION

This problem is solved by providing a switch device for the selection of a desired position corresponding to each protective position of the flat shaped article, as well as a control device, where the control device determines the rotations of the winding shaft and restricts, as a function of the chosen desired position, the pullout distance for the flat shaped article to a corresponding length, or it releases the flat shaped article for complete pullout. The solution according to the invention is particularly suitable for flat shaped article which can be pulled out in a vertical protective position. In the same manner, it is possible to use the solution for flat shaped articles which can be pulled out horizontally in the form of cover surfaces or similar flat shaped articles. The switch device can either be operated manually or it can be subjected to automatic, position-dependent control.

In the case of flat shaped articles which can be pulled out vertically, the length of the flat shaped article is designed so that in the lower functional position, in particular in a tipped lying position of the backrest, the flat shaped article is at least almost completely pulled out into its vertical protective position. In the tipped lying position of the backrest, the flat shaped article, in its protective position, can thus almost no longer be stretched to form a bulge. The same applies to the higher functional position of the winding housing, in particular to an upright functional position of the backrest, because in this position, the pullout distance of the flat shaped article through the control device is restricted. Independently of accelerations applied to the flat shaped article and the winding shaft, a tight retention for objects, animals or other items located in the storage room is created if, in every functional position of the winding housing, the flat shaped article is pulled out and brought into the vertical protection position. In particular, this also guarantees that objects pushed into the flat shaped article, which apply acceleration to the winding shaft below the acceleration limit value, are still safely retained, because the flat shaped article, in all cases, generates a safe and tight retention. It is preferred for the flexible flat shaped article to be designed as a separation net, the principle of which is known. The control device is preferably formed from mechanical components. However, it can also be provided with an electrical or electronic sensing, counting and evaluation components, which can control an electrical drive or an electrical brake device of the winding shaft.

In an embodiment of the invention, the control device presents a mechanical lock device which is provided to block the winding shaft. As a result, a particularly safe retention of the flat shaped article is achieved, where the mechanical design guarantees a simple construction with high functional reliability.

In an additional embodiment of the invention, the control device presents a gravity-dependent switchable regulation element, which is arranged so it can be moved, in such a manner that it can be switched by moving the backrest to its functional or lying position with different final positions. The regulation element is designed and placed in such a manner that it is automatically adjusted, at the time of the tipping of the backrest, to the functional position or the lying position with different final positions, in which the lock device is either actuated or remains inoperative.

In an additional embodiment of the invention, the control device presents a sliding spiral, rigidly attached to the housing, or located on the side of the winding shaft, and a corresponding opposite sliding finger, on the side of the winding shaft or rigidly attached to the housing, which finger engages with the sliding spiral and is radially movable; and the regulation element is provided with a regulation switch which is positioned so it can move in the sliding spiral. Depending on how the regulation switch is positioned by the gravity-dependent regulation, the sliding finger runs in the sliding spiral with or without actuation of the lock device.

In an additional embodiment of the invention, the winding shaft is associated with an acceleration actuated blocking device, which, independently of the lock device, stops the winding shaft if the acceleration value exceeds a defined limit value. As a result, an acceleration dependent device, which acts as an alternative to the locking device, is provided in addition to block the winding shaft and the flat shaped article in its vertical protective position. It is preferred for the acceleration actuated locking device to present an inertial element, which controls a corresponding blocking element. The defined limit value is determined as a function of the stresses applied to the winding shaft in the case of a vehicle impact because of objects which are projected against the tightened flat shaped article.

In an additional embodiment of the invention, the locking device and/or the blocking device are designed in such a manner that, during the blocking of the winding shaft, there is an additional positive-lock wedging with the support profile of the box housing. This design is advantageous if forces applied to the flat shaped article are so strong that the lock device or the blocking device cannot resist this force. As a result of the wedging with a stable support profile of the box housing it is possible, even in case of such high forces, to achieve a positive-lock retention and the continuation of the blocking or locking function.

Additional advantages and characteristics of the invention can be obtained from the claims as well as the following description of a preferred embodiment example of the invention, which is represented with reference to the drawings.

BRIEF DESCRIPTION OF THE DRAWINGS

FIG. 5 is an additional exploded view representing a functional group of the protecting device according to FIGS. 1–4.

FIG. 6 is a perspective exploded view of the functional group according to FIG. 5, with omission of an additional part

DETAILED DESCRIPTION OF THE DRAWINGS

Figure 1:
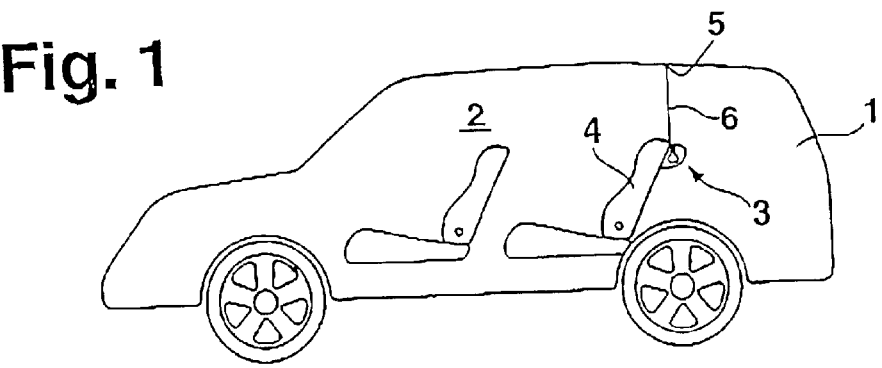
FIG. 1 is a diagrammatic representation of a lateral view of a station wagon with an embodiment variant of a protective device according to the invention, where the flexible flat shaped article of the protective device, in the upright functional position of the backrest, is in its vertical protective position.

While this invention is susceptible to embodiment in many different forms, there are shown in the drawings and will be described in detail herein several specific embodiments, with the understanding that the present disclosure is to be considered as an exemplification of the principle of the invention and is not intended to limit the invention to embodiments illustrated.

Figure 2:
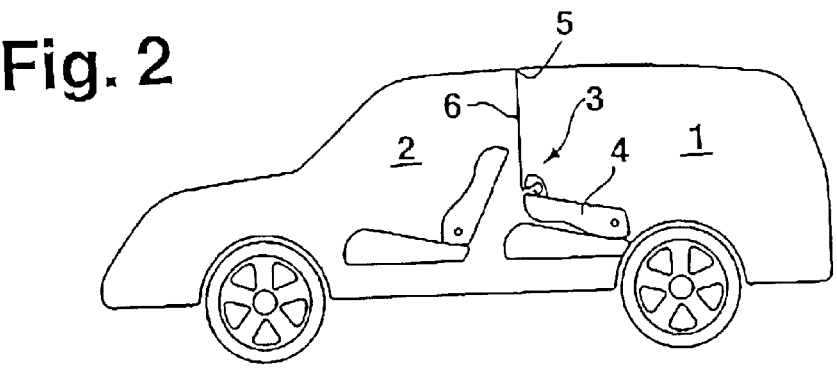
FIG. 2 shows the station wagon according to FIG. 1 with tipped backrest, where the flexible flat shaped article is located in its front, vertical protective position.
Figure 3:
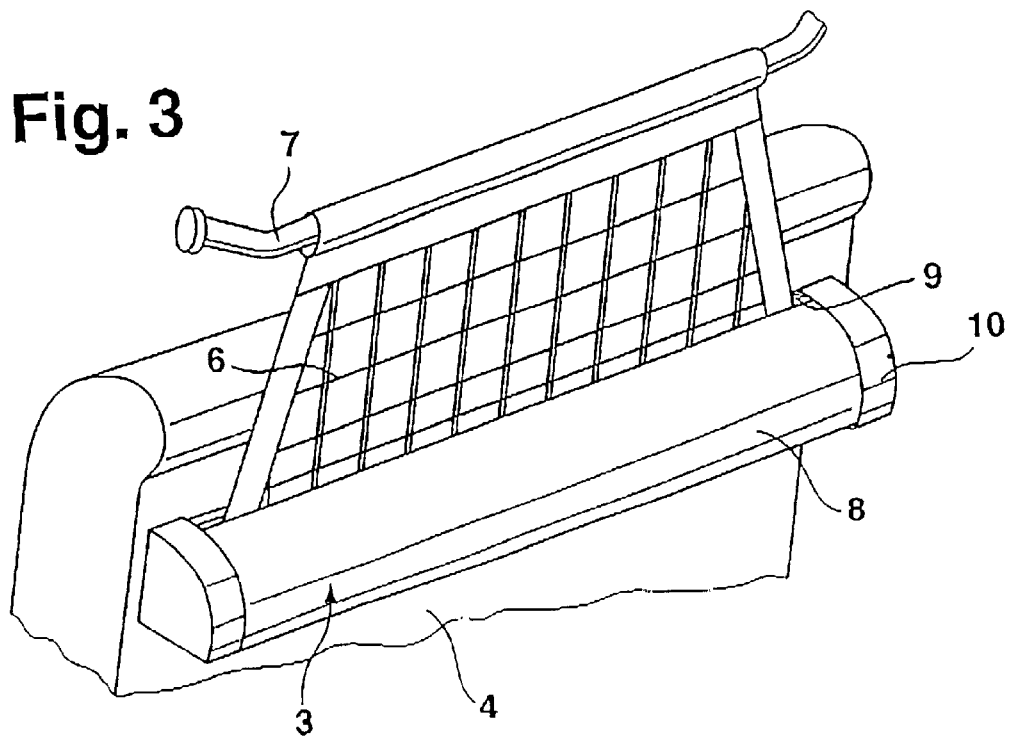
FIG. 3 shows an enlarged perspective representation of the protective device according to FIGS. 1 and 2 with partially pulled out flat shaped article in the form of a separation net.

A vehicle in the form of a station wagon according to FIGS. 1 and 2 presents, in it back, a storage space 1, which can be separated by a protective device 3 from a front vehicle interior 2. The protective device 3, according to FIG. 3, presents a box housing which is attached to the back of a backrest 4 of the back seat in a manner so it can be detached. The box housing is provided with a stable box hollow section 8, which serves as support profile in the sense of the invention. The box hollow section 8 is closed in the area of its opposite front side by a lateral part 10.

A winding shaft 11 is pivoted in the box housing, and a flexible flat shaped article in the form of a separation net 6 is held on it, in a manner so it can be pulled out through a slit 9 of the box housing and rolled up. A front end of the separation net 6 is provided with a pullout bar 7, which can be anchored in holding devices 5 rigidly attached to the vehicle in the roof area of the interior of the vehicle in a vertical pulled out protective position. The separation net 6 can be pulled out in a vertical protective position and attached in corresponding holding devices 5 in the roof area, both in the upright functional position of the backrest 4 (FIG. 1) and in the tipped lying position of the backrest 4 (FIG. 2). The pullout length of the separation net 6 is designed so that the separation net 6 is completely pulled out in the tipped lying position of the backrest 4 and thus positioned only with the front end which is anchored on the side of the winding shaft, in the box housing. As a result a tightened protective position of the separation net 6 is guaranteed.

In the upright functional position of the backrest 4, separation net 6 is only partially pulled out in its vertical protective position represented in FIG. 1. The remaining part of the separation net 6 is rolled on the winding shaft 11.

In this protective position of the separation net 6 as well, the separation net 6 is restricted to prevent additional pulling out, where the backrest 4 is in the upright position. For this purpose, a mechanical control device is provided, which will be described in further detail below. In addition, the protective device 3 presents additional functional units, which are also described below.

Figure 4:
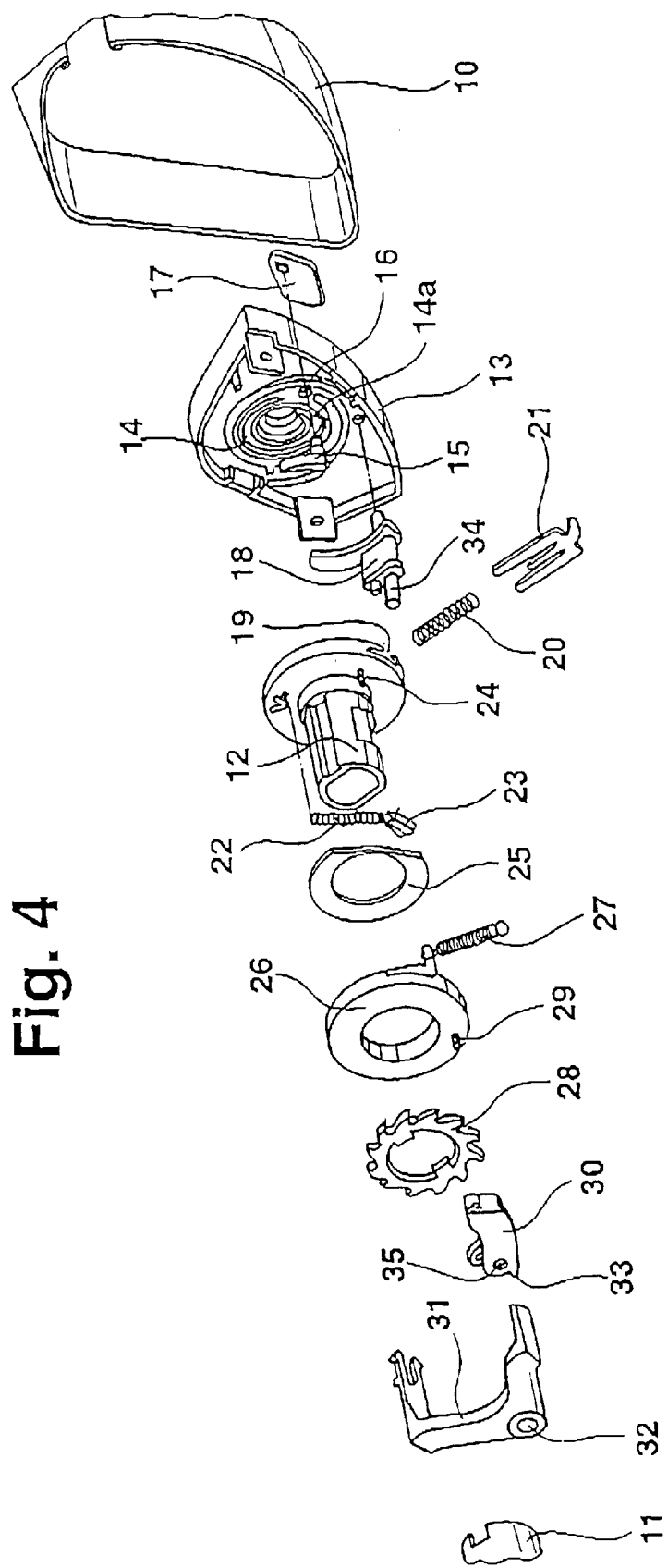
FIG. 4 is an exploded view of the different separate parts of the control device which acts on the winding shaft.
Figure 7:
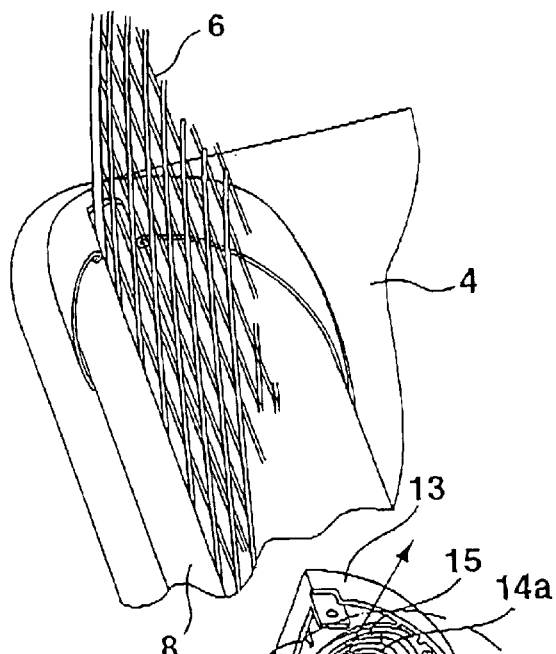
FIG. 7 is a perspective exploded view of an additional functional group of the protective device in the tipped lying position of the backrest.

With reference to FIG. 4, the individual parts of the control device, as well as of the remaining functional units of the protective device 3, can be seen, in their position inside the box hollow profile part 8 and inside the lateral part 10. The control device is associated with the winding shaft 11, which is represented with reference to FIGS. 4–6 in its lateral front area.

Figure 8:
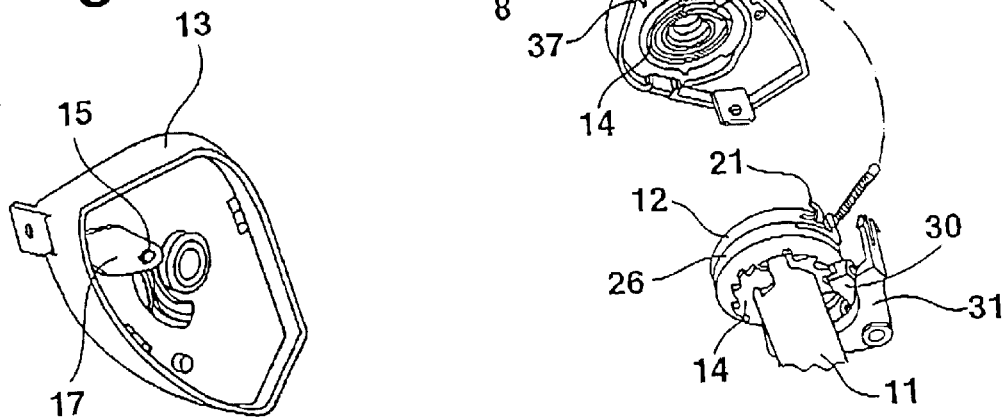
FIG. 8 is an external view of the functional part of the protective device.

A driving collar 12 is firmly connected on the front side to the winding shaft 11, which engages coaxially with a reception area in the open front side of the winding shaft 11. The driving collar 12 in addition presents an annular flange, which is provided with a radial guide 19 for a radially movable sliding finger 21. The sliding finger 21 is associated with a pressure spring 20, which is supported, in the interior, in the radial guide 19, and, on the exterior, by the sliding finger 21, so that spring pressure is applied, radially and outward, to the sliding finger 21 in its functional position. The driving collar 12 is located, with its annular flange, in a spiral housing 13 which is rigidly connected on the front side to a box hollow section. The spiral housing 13 is provided, on the side turned toward the annular flange, with a spiral groove 14, arranged coaxially around the rotating axis of the winding shaft and the driving collar 12, which groove is provided with a fixed, but elastically yielding, tongue-shaped switch 14a as well as with a rotatable regulation switch 15 in the area of a winding located farther out, in the radial direction. The regulation switch 15 is firmly mounted in the corresponding passage 16 of the spiral housing 13, where the corresponding pivot pin of regulation switch 15 has a square end which exits out of the wall of the spiral housing 13, toward the opposite side (FIGS. 4 and 8). A regulation weight 17 is firmly placed onto this square end, and its center of gravity is positioned off center with respect to the support axis of the regulation switch 15, in such a manner that, depending on the position of the backrest 4, a gravity-dependent rotation of the regulation weight 17 occurs, and accordingly a resetting of the regulation switch 15.

In the extension of the radially outmost winding turn of the spiral groove 14, a switch lever 18 is rotatably mounted, which presents an arc-shaped guide element, which extends over the radially outmost winding turn of the spiral groove 14, in the direction toward its free end—seen in the clockwise direction of the spiral groove 14 according to FIG. 4. The switch lever 18 is rotatably mounted on a pivot pin 34, parallel to the regulation switch 15 in the spiral housing 13. The opposite end of the pivot pin 34 is rotatably mounted in a bearing bushing 32 of a bearing clamp 31, which extends axially over all the functional parts and which is rigidly anchored, by means of stop bars which are not identified in detail, in the spiral housing 13.

In addition, an inertial disk 25 is rotatably mounted on the driving collar 12, which inertial disk is associated with a blocking element 23, which is rotatably mounted on a pin 24, which extends axially downward from the annular flange of the driving collar 12. The blocking element 23 is associated with pressure spring 22, which is supported, on the one hand, by the blocking element 23, and, on the other hand, by a bottom end which is not identified in detail (see dash-dot line in FIG. 4) of the annular flange of the driving collar 12. The inertial disk 25 is asymmetric in design, as it is cut off by a straight line on one side. In this edge area, the blocking element 23 is applied by the pressure spring 22 during normal operation of the control device. During normal function of operation, the blocking element 23 functions as a catch for the inertial disk 25, by transferring the rotation of the driving collar 12 to the inertial disk 25. A locking cover 26 is in addition axially placed onto the inertial disk 25 and the driving collar 12, which cover is connected by traction spring 27 to the abutment cam 37 of the spiral housing (FIGS. 5–7 and 9). On the internal side, turned toward the inertial disk 25 and the blocking element 23, the locking cover 26 presents notches 27, which extend from the surface area toward the interior, and are evenly distributed over the circumference (FIG. 9), which notch engages, during the swinging of the blocking element 23 through the inertial disk 25 with the blocking element 23.

A catch disk 28 is provided, in axial series connection, to the locking cover 26, and firmly attached to the driving collar 12. In addition, corresponding grooves are provided on the interior circumference of the catch disk 28, which is axially inserted into the axial grooves (not identified in detail) of the driving collar 12. The catch disk 28 is associated with a catch 30, designed in the shape of a brace, and presenting an internal flat arm, associated with the catch disk 28, as well as an external flat arm associated with the bearing clamp 31. The catch 30 is attached to the switch lever 28, by being inserted from the interior flat arm on the pivot pin 34 by means of a bore 35, on the one hand, and on a smaller holding pin positioned parallel to the pivot pin 34 on the switch lever 18, on the other hand, by means of an additional bore. The interior flat arm of the catch 30, which cannot be seen in FIG. 4 but is revealed in FIG. 6, in addition, presents a sliding guide 36 (FIGS. 6 and 9), into which a sliding pin 29 extends, which is arranged in axial orientation on the external side of the locking cover 26, which is associated with the catch disk 28.

Various functions can be achieved by means of the described parts. Thus, it is possible to achieve a locking of the winding shaft which is dependent on the pullout length of the separation net 6. In addition, an acceleration-sensitive blocking of the winding shaft 11 can be achieved. The locking which depends on the pullout length of the separation net 6 is limited to the upright functional position of the backrest 4. The acceleration-sensitive blocking, in contrast, is independent of the position of the backrest 4 and thus operational both in the upright functional position and in the tipped lying position of the backrest 4. This has the advantage, that according to an embodiment example which is not represented, of the invention, the net length of the separation net 6 can also be greater than the pullout length required for the tipped lying position. In the tipped lying position no locking of the winding shaft which is dependent on the pullout length occurs, because the winding shaft is limited to the upright functional position of the backrest 4. Nevertheless, a reliable retention in case of vehicle impact is guaranteed, because the acceleration-sensitive blocking is also active in the tipped lying position. The locking and the blocking work—as will be explained in greater detail below—thus occur completely independently of each other and they are not coupled to each other.

The acceleration-sensitive blocking principle is first described with reference to the drawings. During normal operation of the protective device, the driving collar 12 rotates with the winding shaft 11, while the locking cover 26, which is rotatably mounted on the driving collar 12, is held by the traction spring 27 in position on the fixed spiral housing 13. In this starting position of the locking cover 26, the sliding pin 29, which extends into the sliding guide 36 of the catch 30, is shifted in such a manner inside the sliding guide 36 that the catch 30 is positioned in its unlocked position with respect to the catch disk 28. As a result of the pressure spring 22, the blocking element 23 is applied without clearance to the inertial disk 25. As soon as a force is applied to the separation net 6 and thus also to the winding shaft, which is above the response threshold of the blocking device, that is above a predefined pullout acceleration, the inertial disk 25 comes to stop opposite the driving collar 12, because of its weight, which automatically results in the blocking element 23, which continues to turn with the driving collar 12, being turned outward, in the radial direction. As a result, the blocking element 23 engages with one of the rest teeth 38 on the internal circumference of the jacket of the locking cover 26, resulting in the wedging of the blocking element 23 with the notch 38, which is then momentarily in an adjacent position. As a result, the locking cover 26 is also moved. Over the sliding pin 29 on the locking cover 26, the catch 30 is automatically deflected, by engaging in a controlled manner with the lock notch of the catch disk 28. At the time of contact between the catch 30 and the lock notch of the catch disk 28, the entire mechanical system becomes wedged, resulting in the blocking of the winding shaft 11.

In order to limit the pullout length of the separation net 6 in the upright functional position of the backrest 4, the regulation switch 15 is automatically deflected, due to the upright functional position of the backrest 4, into a position which blocks an external, adjacent winding turn (FIG. 6). In the rest position of the separation net 6, when it is completely rolled on the winding shaft 1, the catch finger 21 is in the area of the innermost spiral winding of the spiral groove 14, and it is pressed by the pressure spring 20 against the wall of this spiral winding. As soon as the separation net 6 is then pulled upward, the sliding finger 21 moves counterclockwise—with reference to the representation of FIGS. 5 and 6—along the windings of the spiral groove 14. As a result of the regulation weight 17, the regulation switch 15 is in its closed regulation position. As soon as the catch finger 21 moves along the regulation switch 15, it pushes the latter outward, where the regulation switch 15 is rotated back into the closed regulation position, after the continued movement of the catch finger 21. As a result, the catch finger can run on the outside along the closed regulation switch, in the next spiral winding. In the outermost spiral winding, the catch finger 21 comes to be in contact with the arc-shaped guide element of the switch lever 18, which results in this arc-shaped guide part being pushed outward due to the pressure force of the pressure spring 20. At the same time, this results in the guided introduction, toward the inside, of the catch 30 which is rigidly connected with the notch of the switch lever 18 and in the wedging with the notch of the catch disk 28. As a result, the entire mechanical system is locked analogously to the above-described blocking device, and the winding shaft 11 can no longer be rotated. This automatically results in the locking of any additional pulling out of the separation net 6. By means of the spiral groove 14, a counting unit for the rotation of the winding shaft 11 is created. The engagement of the catch 30 as a function of the number of rotations of the winding shaft 11 is adjusted in such a manner to the pullout length of the separation net 6, that the pullout length of the separation net 6, at the time of the locking, is so large that it is just possible to suspend the pullout bar in the holding device which is rigidly attached to the vehicle in the roof area.

In order to be able to roll the separation net 6 from the restricted position back into the box housing, the pullout bar is simply again disengaged from the holding devices which are rigidly attached to the vehicle, which results in the return spring, which is not represented in detail, and which acts on the winding shaft 11, pulling the separation net 6 downward, as it is rolled onto the winding shaft 11. In the process, the catch finger 21 moves counterclockwise toward the interior along the spiral contour. As a result of the traction spring 27, analogously to the above-described blocking device, the catch 30 is again moved out over the sliding pin 29 and the sliding guide 36, releasing the catch disk 28. The catch finger 21 runs counterclockwise against the fixed, but elastically yielding, switches 14a, which were passed over clockwise in a simple manner. As a result, the carrier finger at this switch 14a directly jumps to the next internal spiral winding, so that one spiral winding was saved compared to the pulling out. Until the separation net 6 is completely rolled up, the catch finger 21 thus runs one more time completely around the innermost winding, and then jumps to the next higher winding, and then again completes the current rotation at the internal end of the inner spiral winding.

In the tipped lying position of the back seat 4, the regulation weight 17 is rotated by its own weight in such a manner that the regulation spring 15 is positioned in its open position, in which an external spiral winding is locked, and the entrainment finger is forced back onto the next internal spiral winding. As a result, the carrier finger, during the pulling out of the separation net 6 cannot run into the outermost spiral winding and actuate the switch lever 18, so that the separation net 6 can be fully pulled out without limitation. The new rolling up of the separation net 6 from the vertical protective position, with the backrest 4 in the tipped lying position according to FIG. 7, occurs analogously to the rolling up process in the case of the upright functional position of the backrest 4 except that the catch finger 21, in the area of the innermost spiral winding, in each case jumping to the next external spiral winding, performs several rotations, until the separation net 6 is completely rolled up.

The design of the spiral groove 14 and thus of the spiral housing 13 is crucial for determining the different separation net pullout lengths to be used. The total length of the separation net 6 is predetermined in its construction by the length of the spiral groove 14. The extended length of the innermost spiral winding defines the possible variations in length. If corresponding tolerances and variations in the separation net length are within the range of the length of the innermost spiral winding, then it is possible to use the same spiral housing 13 for these different separation lengths.

Figure 9:
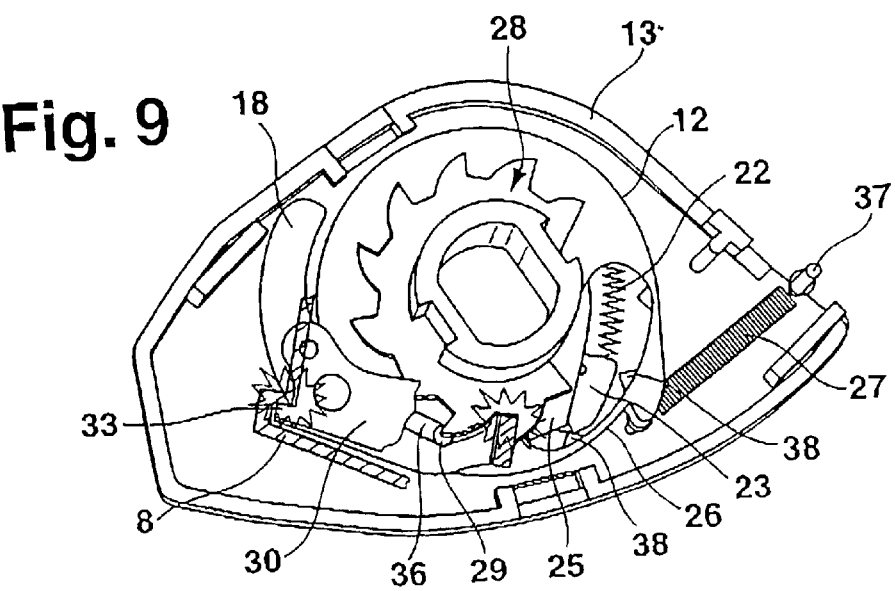
FIG. 9 is a top view of the control device according to the preceding figures in a locked position with wedging with a support profile of the box housing.

To improve, during the locking or blocking of the protective device by the catch 30, the flow of the forces, at least one support attachment 33 is provided, according to FIGS. 4 and 9, on the back of the catch 30, which attachment can wedge, in the case of locking, in a corresponding profiled recess of the box hollow section 8 according to FIG. 9. The flow of the forces is thus from the separation net, to the winding shaft 11 and from there to the catch disk 28, to the catch 30, and then the box hollow section 8, which makes it possible to achieve a particularly stable support and thus blocking or locking. This is advantageous, if the forces which occur are so strong that the catch and the catch disk alone cannot guarantee a reliable stopping of the winding shaft.

Figure 10:
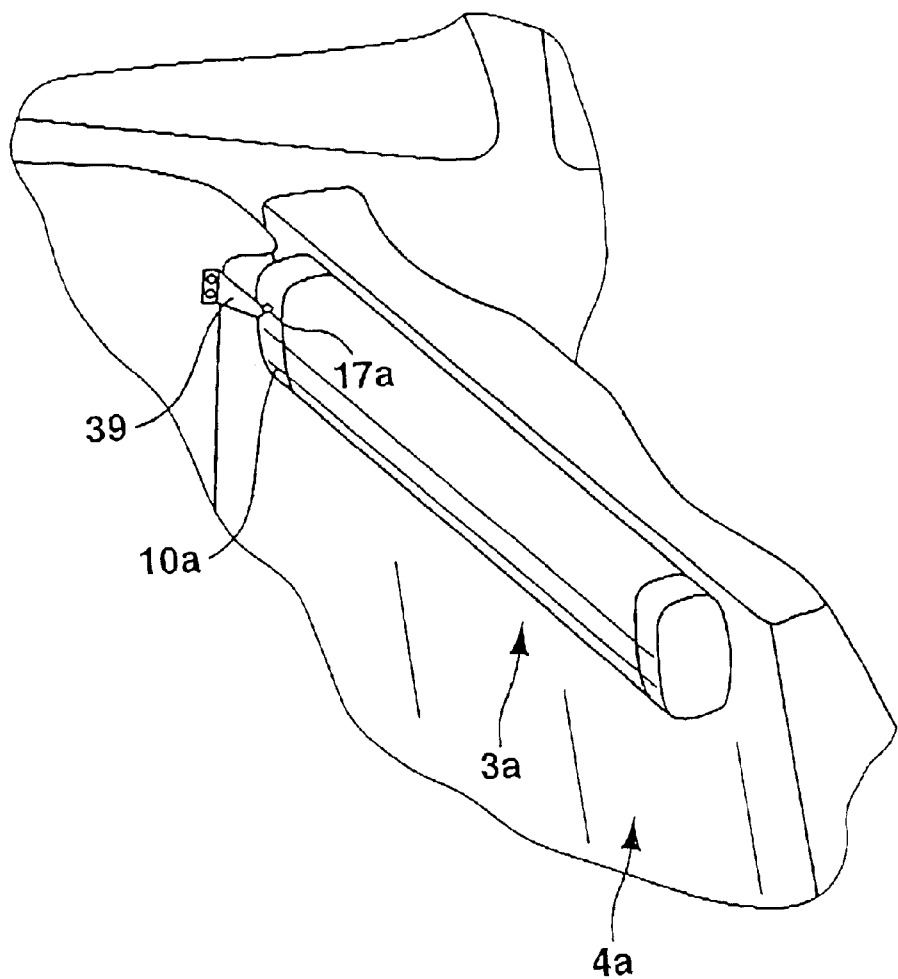
FIG. 10 is a perspective view of an additional embodiment variant of a protective device according to the invention in the vehicle interior of a motor vehicle.
Figure 11:
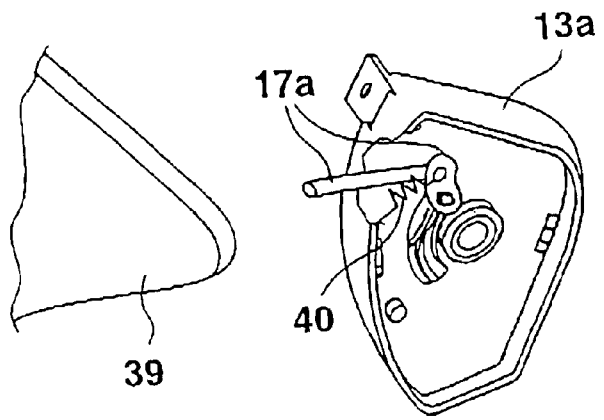
FIG. 11 is an enlarged perspective view of a section of the protective device according to FIG. 10.

In the embodiment example of a protecting device 3a according to the invention and FIGS. 10 and 11, the control device, with the exception of the differences described below, is designed as in the above-described embodiment example; and, with the exception of the differences described below, all of the parts of the protecting device visible in FIG. 1 are present. An essential difference in the case of the protecting device represented in FIGS. 10 and 11 is that, as sensor device to determine the functional position of the box housing used as winding housing, the switch element which actuates the regulation switch 15 is formed by a sensor pin 17a, which rotates the regulation switch and extends, in a manner of a probe, out of the winding housing according to FIGS. 10 and 11. As soon as the winding housing is brought against an abutment 39 which is rigidly attached to the vehicle in the corresponding functional position, the sensor pin 17a comes to be applied against the abutment 39, and it is pushed toward the interior into the winding housing. As a result, the rotation of the regulation switch occurs with the functions to be carried out according to the above-described embodiment examples. As a result of a spring arrangement 40, the sensor pin 17a is again pressed back into its starting position, extending out of the box housing, as soon as the load is removed from the abutment 39. Therefore, as soon as the winding housing is removed from the functional position with contact against the abutment 39, the sensor device is also pressed back into the starting position. Independently of gravitational influences, different functional positions of the box housing can thus be determined and converted into different pullout lengths of the flat shaped article, without requiring a change in the tipped position of the box housing for that purpose.

Naturally, in other embodiment examples of the invention, other types of sensing devices can also be provided, which are in contact with corresponding switch devices, in order to initiate the different pullout processes for the flat shaped article as a function of the predetermined functional position of the box housing.

Figure 12:
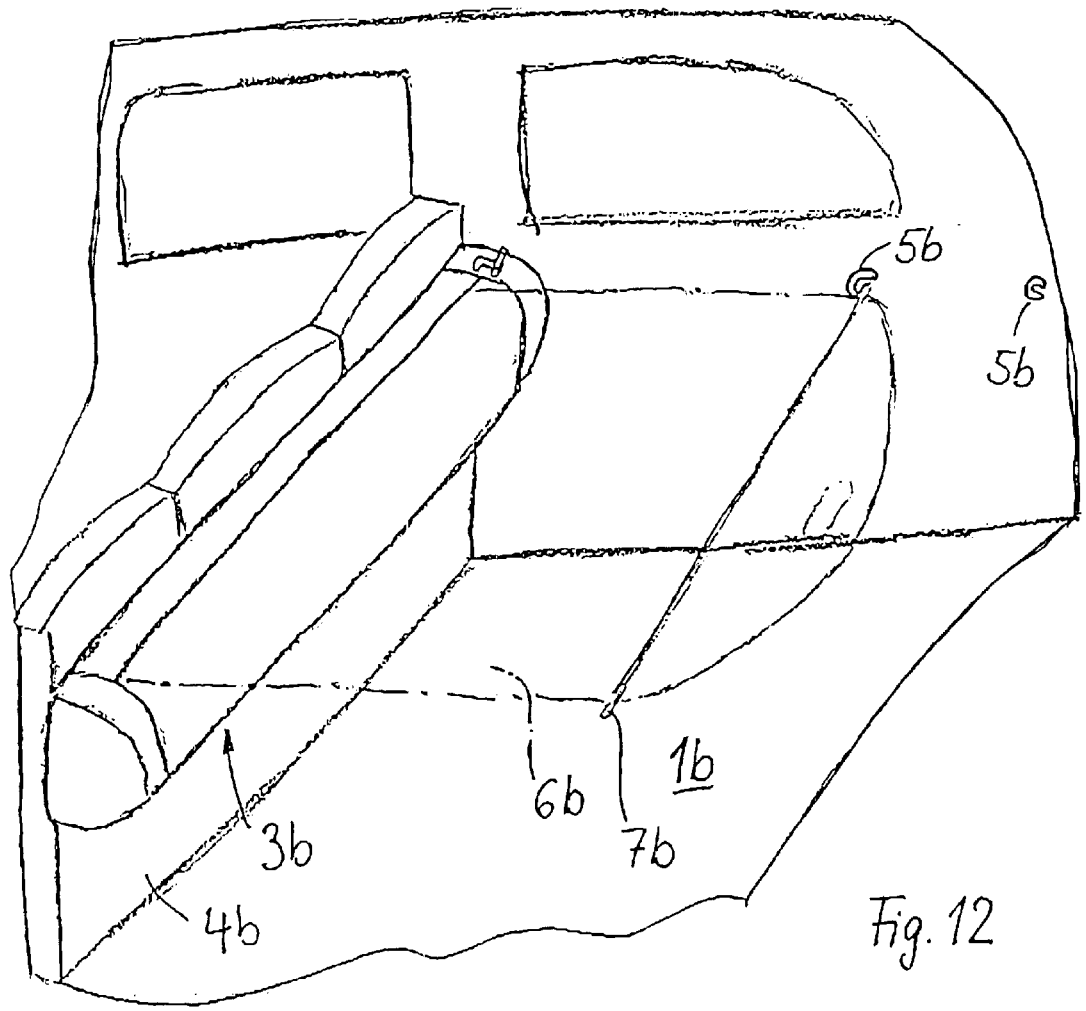
FIG. 12 is a schematic perspective representation of an additional embodiment variant of a protective device according to the invention with a flat shaped article which can be pulled out horizontally and FIG. 13 is an enlarged representation of a functional part of the protective device according to FIG. 12.
Figure 13:
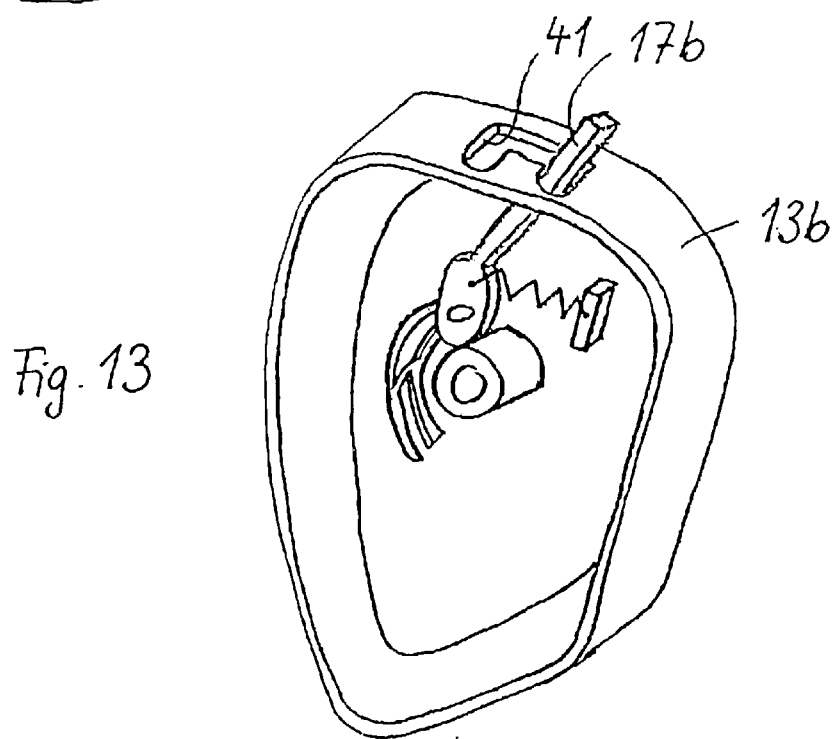

In the embodiment example according to FIGS. 12 and 13, a protective device 3b is provided with a flat shaped article which can be pulled out horizontally, and which is in the shape of a cover hood 6b in the area of a storage space 1b of a motor vehicle. A winding housing of the protecting device 3b is located in the area of a backrest 4b, where the winding housing is rigidly attached to the vehicle either in holding devices on the side of the body of a car or in holding devices of the backrest. The cover hood 6b can be pulled out into different protective positions, which are defined by the recesses 5b provided, on the side of the vehicle, in the sidewalls. The control device and the switch device essentially correspond to those given earlier with reference to FIGS. 10 and 11 and the embodiment examples disclosed in FIGS. 1–9, so that reference is made to the description provided above for a more detailed explanation. The only difference in the protective device according to FIGS. 12 and 13 is that the switch device is not automatically switched by a corresponding determination of position or place, rather the switching is manual by means of an actuation pin 17b, which can be switched to the corresponding switch state by means of a slide guide 41 provided in the cover-shaped lateral part 13b, and which can be secured in that state. Moreover, depending on the switch state, the actuation pin 17b effects the limitation, or the release, of the pullout path of the horizontal flat shaped article in the form of a cover hood 6b, which restriction is known from the embodiment example according to FIGS. 10 and 11.

For the purpose of securing in the recesses 5b on the side of the vehicle, the cover hood 6b, at its front end, presents a contoured part, which is provided, on the side, with suspension hooks 7b in the extension of a pullout bar of the dimensionally stable contour part.

The foregoing description and drawings merely explain and illustrate the invention, and the invention is not limited thereto except insofar as the appended claims are so limited, inasmuch as those skilled in the art, having the present disclosure before them, will be able to make modifications and variations therein without departing from the scope of the invention.

What is claimed is:

1. A protective device for securing a storage space in the interior of a vehicle with a winding shaft which is pivoted in a winding housing, on which a flexible flat shaped article is held in a manner so it can be pulled out and rolled in, which can be anchored in at least one short and at least one long protective position, which allows the structure to be pulled out, characterized in that a switch device for selecting a desired position corresponding to each protective position of the flat shaped article, as well as a control device, are provided, where the control device determines the rotations of the winding shaft and restricts, as a function of the chosen desired position, the pullout distance for the flat shaped article to a corresponding length, or releases it for complete pullout, the control device including a mechanical lock device (15, 17, 18, 28, 30) which is provided to block the winding shaft 11, the winding housing being arranged on a hinged backrest, and the switch device including a gravitation-dependent switchable regulation element (15, 17) which is arranged so it is switched by the movement of the backrest between different functional positions, the control device further including a sliding spiral (14), rigidly attached to the winding housing, or located on the side of the winding shaft, and a corresponding, opposite, sliding finger (21) which is located on the side of the winding shaft, or rigidly attached to the winding housing, which engages the sliding spiral (14) and is moveable relative to the sliding spiral (14), and in that the regulation element is provided with a regulation switch (15) which is positioned, so it can be moved, in the sliding spiral (14).

2. The protective device according to claim 1, where the winding housing can be positioned, in a manner with rigid attachment to the vehicle, in at least two functional positions with a respect to the height of the vehicle interior, and where the flat shaped article in both functional positions of the winding housing is anchored rigidly to the vehicle and in a manner allowing it to be pulled out in at least one vertical protective position, characterized in that the control device presents a sensor device for the determination of the functional position of the winding housing, which is connected with a switch device for the release or the restriction of the pullout path of the flat shaped article.

3. The protective device according to claim 1, characterized in that the winding shaft (11) is associated with an acceleration-dependent actuated blocking device (23, 25, 26, 28, 30, 38), which, independently of the lock device, stops the winding shaft (11) if the acceleration exceeds a predefined limit value.

4. The protective device according to claim 3, characterized in that the blocking device comprises an inertial element (25).

5. The protective device according to claim 3, characterized in that at least one of the lock device and the blocking device is designed in such a manner that, during the blocking of the winding shaft (11), there is, in addition, a positive-lock wedging with a support profile (8) of the box housing.

6. The protective device according to claim 3, characterized in that the lock device or the blocking device presents a catch (30) as well as a catch disk (28), which is connected to the winding shaft (11) so it rotates, where the catch (30) can be controlled directly or indirectly by the sliding finger (21) or the inertial element (25).

7. A The protective device according to claim 6, characterized in that the control device is designed in such a manner that the catch (30) is actively guided in a controlled manner into a tooth gap of the catch disk (28).

* * * * *